United States Patent [19]
Keehner et al.

[11] Patent Number: 5,388,884
[45] Date of Patent: Feb. 14, 1995

[54] ARRANGEMENT FOR MOUNTING A CAB STRUCTURE TO A VEHICLE FRAME

[75] Inventors: Daniel M. Keehner; Gail F. Westendorf, both of Decatur, Ill.

[73] Assignee: Caterpillar Inc., Peoria, Ill.

[21] Appl. No.: 50,937

[22] Filed: Apr. 21, 1993

[51] Int. Cl.$^6$ .............................................. B62D 23/00
[52] U.S. Cl. ..................................... 296/190; 296/35.1
[58] Field of Search ...................... 296/190, 35.1, 35.2

[56] References Cited

U.S. PATENT DOCUMENTS

| | | | |
|---|---|---|---|
| 3,733,103 | 5/1973 | Hansen | 296/35.1 |
| 3,851,982 | 12/1974 | See | 403/224 |
| 3,868,190 | 2/1975 | Moore | 403/189 |
| 4,082,343 | 4/1978 | Hurt, II et al. | 296/35.1 |
| 4,135,757 | 1/1979 | Smith et al. | 296/35.1 |
| 4,184,712 | 1/1980 | Skahill | 296/190 |
| 4,210,362 | 7/1980 | Boersma | 296/190 |
| 4,650,242 | 3/1987 | Obe et al. | 296/190 |
| 4,819,980 | 4/1989 | Sakata et al. | 296/190 X |
| 4,989,684 | 2/1991 | Conaway | 296/190 X |
| 5,024,283 | 6/1991 | Deli | 296/190 X |
| 5,064,242 | 11/1991 | Fujan et al. | 296/190 |
| 5,150,942 | 9/1992 | Fujan et al. | 296/190 |

Primary Examiner—Joseph D. Pape
Attorney, Agent, or Firm—Calvin E. Glastetter

[57] ABSTRACT

Cab and rollover structures are useful for protecting an operator while operating a vehicle. When an integral cab rollover structure is used it is necessary to provide a mount which will isolate the structure from the frame to reduce vibration and noise and also to provide a solid connection to transfer loads during rollover. The subject mounting arrangement will provide a mounting structure which will isolate the cab rollover structure from the frame in a normal first operating condition to reduce noise and vibration within the cab. In a second condition of operation the isolating structure will deform allowing the mounting structure to contact the frame and withstand forces on the cab rollover structure. This arrangement of components provides an isolated mount which will not be overstressed during a vehicle rollover.

8 Claims, 3 Drawing Sheets

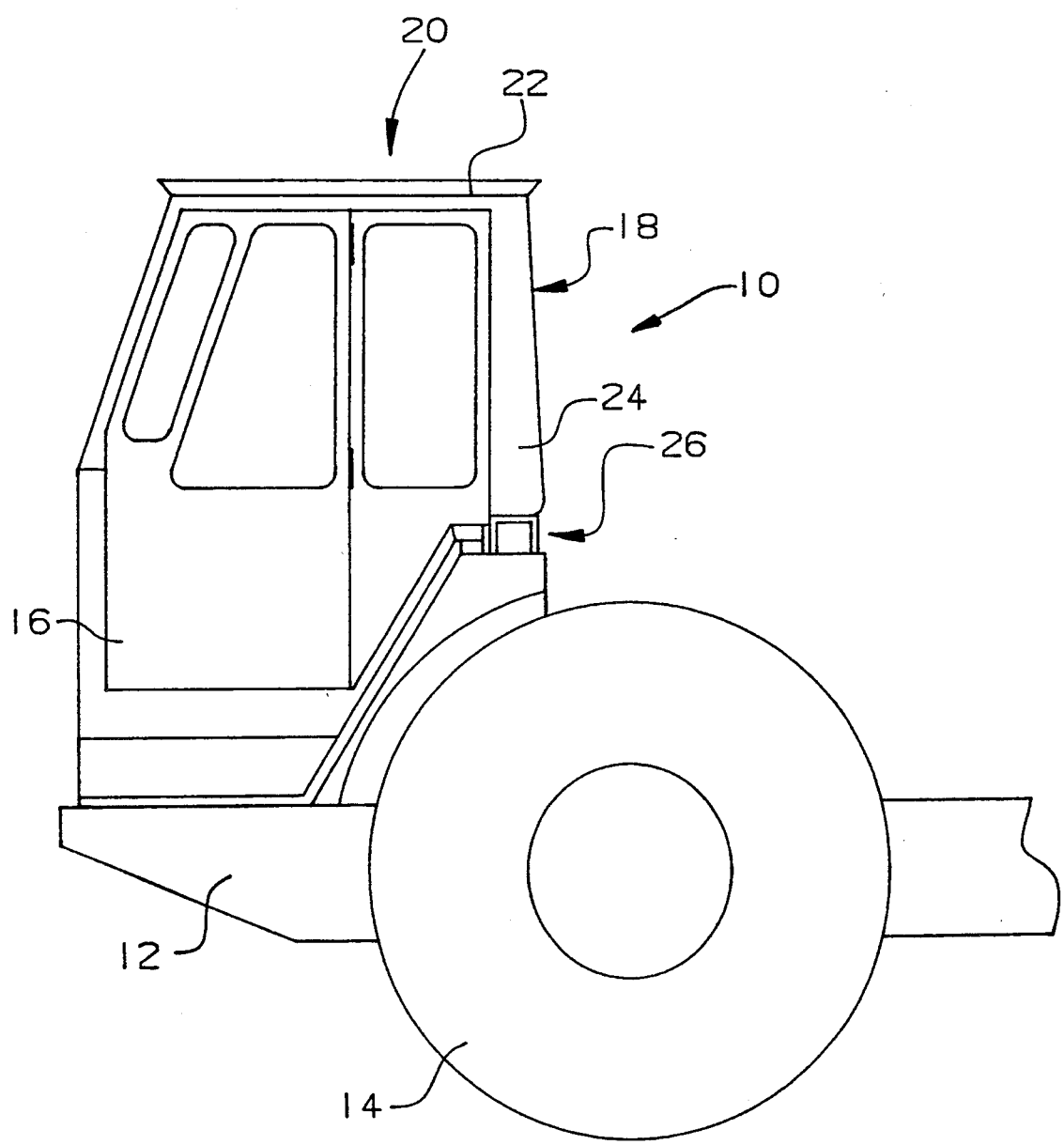
Fig_1_

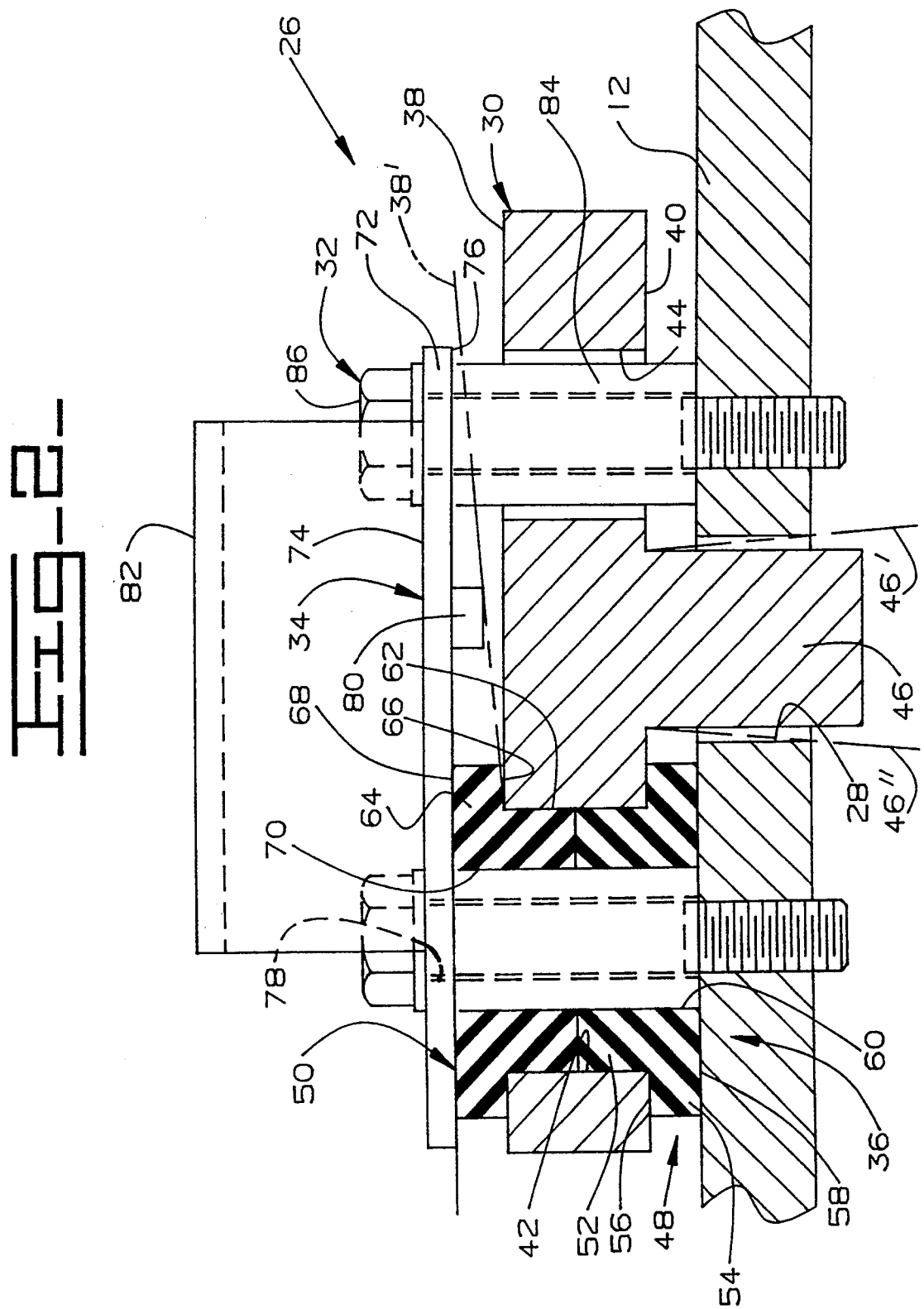

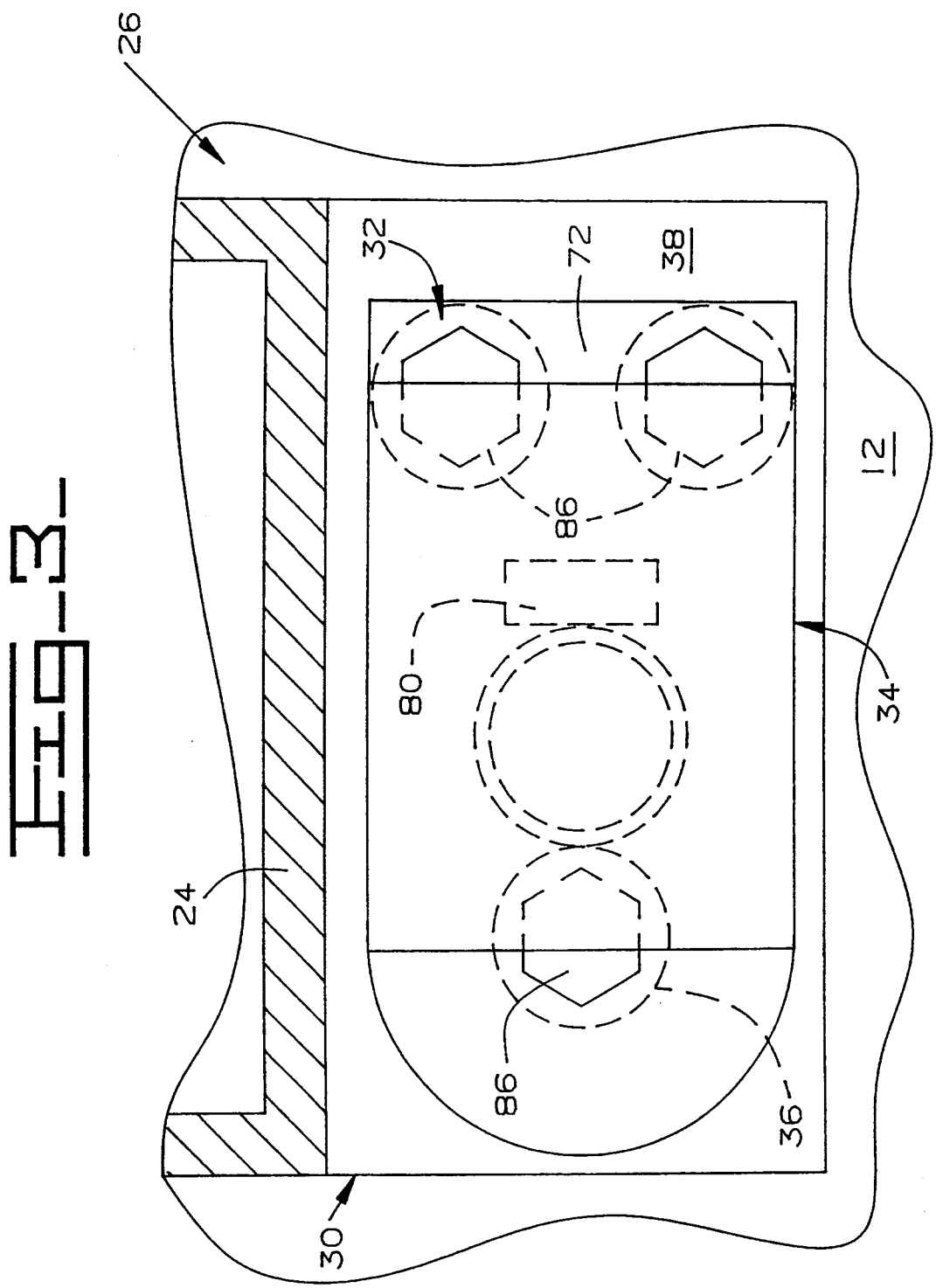

ARRANGEMENT FOR MOUNTING A CAB STRUCTURE TO A VEHICLE FRAME

TECHNICAL FIELD

This invention relates generally to an arrangement for mounting an integral cab rollover protection structure to a vehicle frame and more particularly to a mounting having a first condition which isolates the protection structure from the frame member and a second condition wherein the base of the protection structure will contact the frame member and transfer loads from the protection structure into the frame member.

BACKGROUND ART

Integral cab rollover protection structures are useful to protect the operator of a vehicle working in rugged environments from vibration, noise and also from injury in the event of vehicle rollover or other forces asserted on the protection structure. Typically the cab will be formed of sheet metal material and secured to the rollover protection structure. The rollover protection structure must withstand the forces encountered during vehicle rollover. Therefore, the mounting for the protection structure must transfer the forces into the frame with a hard connection. The rollover protection structures are bolted directly on the frame to withstand the forces.

One of the problems associated with an integral cab rollover protection structure is that the structure must be isolation mounted on the vehicle frame to reduce vibration and noise within the cab. However, the isolation mounts required a large bolt positioned within a rubber bushing mount to provide the isolation and also absorb the forces in a vehicle rollover. With larger equipment the size of the bolt was getting to large to be practical. When more then one bolt was used the amount of isolation was reduced and more noise and vibration was passed into the cab. Also when more than one bolt was used the forces in the mountings were not distributed evenly among the bolts.

The present invention is directed to overcoming one or more of the problems as set forth above.

DISCLOSURE OF THE INVENTION

In one aspect of the present invention a mounting arrangement is provided between a frame having apertures defined therein and an integral rollover structure. The arrangement includes a plurality of base members each having a protrusion positioned within the apertures in the frame. Means are provided for fastening the base members to the frame. Means are provided for distributing loads from the base members into the fastening means. The load distributing means are positioned on the fastening means in a spaced relationship to the base members. Means are also provided for isolating the base members from the frame member in a first condition. The isolating means is deformable to a second condition to allow contact between the protrusion and the frame member.

The present invention provides a mounting which uses a rubber mounting to isolate the base members of the rollover structure from the vehicle in a first condition and will deform to allow the base members to contact the frame in a second condition. The rubber mounting will reduce vibration and noise within the cab and also provide a solid mount in the event of a vehicle rollover or other forces on the protection structure. The mounting will also distribute the forces within the fastening means.

BRIEF DESCRIPTION OF THE DRAWINGS

FIG. 1, is a side view of a vehicle showing a cab rollover protection structure of the present invention;

FIG. 2, is a sectional view of one of the mounting structures of the present invention; and FIG. 3, is a plan view of the mounting structure.

BEST MODE FOR CARRYING OUT THE INVENTION

Referring now to FIG. 1, there is shown the present invention for use with a tractor portion of an earthmoving vehicle such as a wheel scraper. The tractor portion 10 of the scraper has a main frame 12, a plurality of steering and driving wheels 14, (only one is shown), an operators cab 16 and a rollover protection structure 18. The operators cab 16 and the rollover protective structure 18 will hereafter be referred to as a ROPS assembly 20.

While the ROPS assembly 20 can take any variety of forms, it will customarily include elevated, generally horizontally extending structural members 22 supported above the main frame 12 by means of a plurality of generally vertically extending posts 24. The posts 24, in turn, are typically secured by a resilient mounting arrangement 26 to any suitable portion of the main frame 12 or the tractor portion 10.

Referring now to FIGS. 2 and 3, the main frame 12 of the tractor portion 10 includes a plurality of apertures 28, (only one is shown), suitably positioned and sized for receiving a portion of the mounting arrangement 26.

Each of the mounting arrangements 26 include a base member 30, means 32 for fastening the base member 30 to the frame 12, means 34 for distributing loads and means 36 for isolating the base member 30 from the frame 12.

The base member 30 is attached to one of the vertically extending posts 24 of the ROPS assembly 20 and extends horizontally therefrom, perpendicular to the posts 24. The base member 30 has an upper surface 38 and a lower surface 40. The base member 30 has a first hole 42 therethrough for receiving a portion of the isolation means 36 and a second hole 44 therethrough for receiving a portion of the fastening means 32. The base member 30 further includes a protrusion 46 which extends from the lower surface 40 into the aperture 28 of the main frame 12. The protrusion 46 has a smaller diameter then the diameter of the aperture 28 in the main frame 12 for maintaining a clearance in a first condition of operation. In a second condition of operation the protrusion 46 will contact the main frame 12, as shown by reference numerals 46' and 46".

The isolating means 36 includes a first bushing 48 and a second bushing 50. The bushings 48, 50 can be made from any suitable material, such as elastomer, which will give the proper isolation and vibration control. The first bushing 48 has a reduced portion 52 which is positioned within the first hole 42 of the base member 30. The first bushing 48 further includes a flange 54 having a first surface 56 contacting the lower surface 40 of the base member 30 and a second surface 58 contacting the main frame 12. The first bushing 48 has a hole 60 which extends therethrough. The second bushing 50 has a reduced portion 62 which is also positioned within the first hole 42 of the base member 30. The second bushing 50 further includes a flange 64 having a first surface 66 contacting the upper surface 38 of the base member 30 and a second surface 68 contacting a portion of the distribution means 34. The second bushing 50 has a hole 70 which extends therethrough. The holes 60, 70 are aligned with each other. The bushings 48, 50 will deform to allow contact between the protrusion 46 of the base member 30 and the main frame 12 in a second condition of operation.

The distribution means 34 includes a cover plate 72 having an upper surface 74 and a lower surface 76. The cover plate 72 has a plurality of holes 78 therethrough. The lower surface 76 of the cover plate contacts the second surface 68 of the second bushing 50. A bar 80 is attached to the lower surface 76 of the cover plate 72 to distribute loads evenly into the cover plate 72 when the base member 30 contacts the bar 80, as shown by reference numeral 38' in FIG. 2. The bar 80 can be positioned and sized differently for various size mounting arrangements 26. A stiffener bracket 82 is attached to the upper surface 74 of the cover plate 72 to increase the stiffness of the cover plate 72.

The fastening means 32 includes a plurality of tubular spacers 84 and a plurality of bolts 86. The plurality of tubular spacers 84 are positioned between the main frame 12 and the lower surface 76 of the cover plate 72 to limit compression of the isolation means 36 and also maintain spacing between the cover plate 72 and the main frame 12. One of the plurality of tubular spacers is positioned within the holes 60, 70 of the bushings 48, 50 which are positioned within the first hole 42 of the base member 30. Another one of the plurality of tubular spacers is positioned within the second hole 44 of the base member 30. The plurality of bolts 86 pass through the holes 78 of the cover plate 72 and the tubular spacers 84 and are threadably fastened into the main frame 12.

Industrial Applicability

In the use of the present invention an arrangement for mounting 26 a ROPS 20 to a vehicle frame 12 is provided. The arrangement 26 includes a mounting structure attached to the ROPS 20. In normal operation to reduce vibration and noise within the cab 16 the mounting arrangement is isolated from the main frame 12. The isolation means 36 includes the first and second bushing 48, 50 positioned within the first hole 42 of the base member 30. The bushing 48, 50 are positioned around a bolt 86, the flange 54 is positioned between the base member 30 and the frame 12 and the flange 64 is positioned between the base member 30 and the cover plate 72. The protrusion 46 on the base member 30 does not contact the frame 12. During a vehicle rollover or if other force is applied to the ROPS 20 the mounting arrangement 26 must withstand the forces and also prevent overstressing the bolts 86. When a large force is applied on the ROPS 20 the bushings 48, 50 will deform and allow the protrusion 46 on the base member 30 to contact the main frame 12. The contact will prevent the bushings 48, 50 and the bolts 86 from being over loaded. Upward movement of the base member 30 will be stopped when the base member contacts the bar 80. The bar will also distribute the forces evenly among the bolts 86 to prevent over loading one bolt.

In view of the foregoing, it is readily apparent that the structure of the present invention provides a mounting arrangement which will provide an isolated mount in one condition of operation and a solid mount in a second condition of operation.

Other aspects, objectives and advantages of this invention can be obtained from a study of the drawings, the disclosure and the appended claims.

We claim:

1. A mounting arrangement between a frame having apertures defined therein and a post of a rollover structure, comprising:

a base member attached to the post of the rollover structure and having a protrusion formed thereon, the protrusion being positioned within the apertures of the frame;

means for attaching the base member to the frame;

means for distributing loads from the base member into the fastening means, the load distributing means being positioned on the fastening means in normally spaced relationship to the base members; and means for isolating the base member from the frame, the isolating means is positioned about the fastening means in interposed relationship to the base member and the frame to isolate the base member from contact with the fastening means in a first condition, and being deformable to a second condition to allow contact between the protrusion and a periphery of the apertures of the frame to transfer loads between the base member and one of the load distributing means and the frame.

2. A mounting arrangement for supporting a post of an integral cab and rollover protection structure, comprising:

a frame member having an aperture;

a base member attached to the post of the rollover protection structure, the base member defining a hole and a protrusion, the protrusion being positionable within the aperture of the frame member;

means for removably attaching the base member to the frame member;

means for distributing loads from the base member into the fastening means, the load distributing means being positioned on the fastening means in a normally spaced relationship to the base member; and means for isolating the base member from contact with the frame member and being positioned within the hole of the base member, the isolating means being positioned about the fastening means to extend between the distributing means and the frame member to isolate the base member from contact with the fastening means in a first condition, the isolating means being deformable to a second condition to allow contact between the protrusion of the base member and the periphery of the aperture in the frame member to transfer loads between the base member and one of the load distributing means and the frame.

3. The mounting arrangement of claim 2, wherein the protrusion has a smaller diameter than the diameter of the aperture in the frame, the protrusion being spaced from the frame in the first condition and contacting the frame in the second condition.

4. The mounting arrangement of claim 2, wherein the fastening means includes a plurality of bolts and spacers.

5. The mounting arrangement of claim 4, wherein the distributing means includes a cover plate attached to the frame member by the plurality of bolts.

6. The mounting arrangement of claim 5, wherein the distributing means further includes a bar attached to the cover plate.

7. The mounting arrangement of claim 6, wherein the isolating means includes a first bushing positioned between the frame member and the base member and a second bushing positioned between the base member and the cover plate.

8. The mounting arrangement of claim 7, wherein the bushings are made from elastomeric material.

* * * * *